Aug. 12, 1969   G. MAROUBY   3,461,447
FLUID LEVEL INDICATOR
Filed July 14, 1966
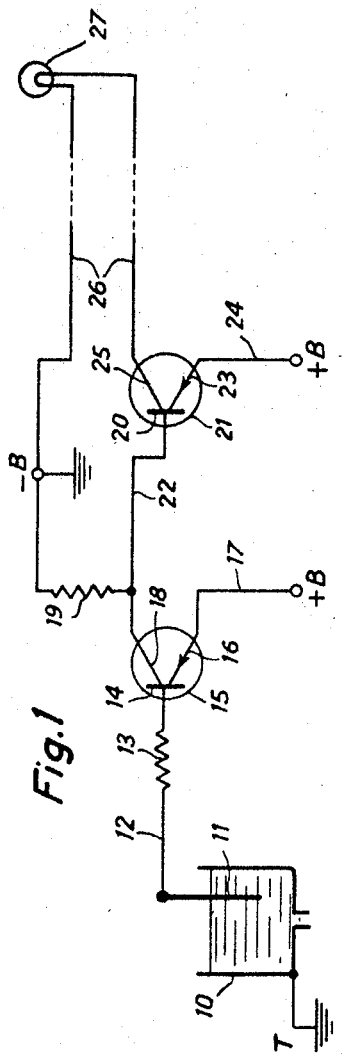
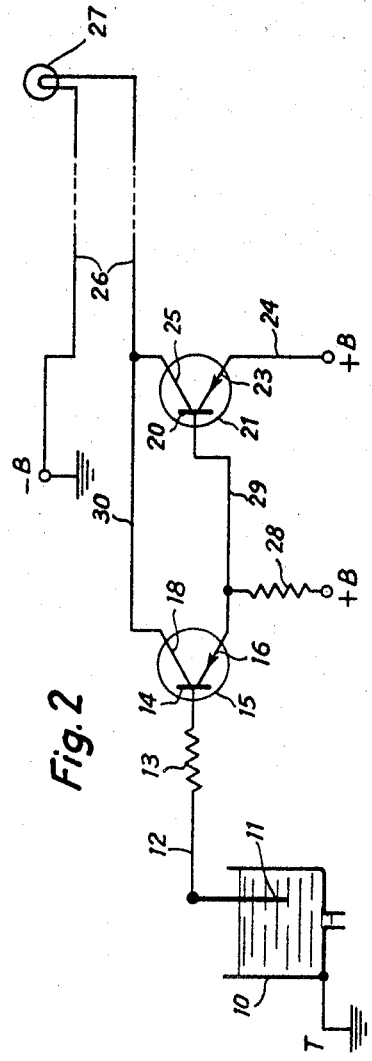

United States Patent Office 3,461,447
Patented Aug. 12, 1969

3,461,447
FLUID LEVEL INDICATOR
Guy Marouby, Neuilly, France, assignor to Societe Anonyme D.B.A., Paris, France
Filed July 14, 1966, Ser. No. 565,180
Claims priority, application France, Sept. 10, 1965, 31,025
Int. Cl. G08b *21/00*
U.S. Cl. 340—244  2 Claims

ABSTRACT OF THE DISCLOSURE

This invention relates to a brake fluid level indicator for use with a vehicle. The device is comprised of a transistorized amplifier means responsive to a fluid presence sensing means for controlling a warning circuit which gives an indication when said fluid level falls to a predetermined minimum level.

---

Level indicators of brake fluid have been provided in the past which employ an electromechanical system. A system of this type includes, for example, a float which follows the fluid level and is integral with a rod adapted to close a switch contact for a minimum fluid level, the closure of the switch contact causing a voltage to be applied to a warning circuit. Apart from the fact that such a system includes movable parts, the closure of the switch contact is fairly often not frank, so that sparks are produced which damage the contact elements.

Accordingly, an object of the invention is to overcome the inherent disadvantages of the previously known level indicators utilizing an electromechanical system by providing a level indicator of brake fluid for automobile which has no movable parts and which does not require the use of contact members likely to be damaged.

Another object of the invention is to provide a level indicator of brake fluid for automobile which is sturdy, entirely electric, and of very small size, and which only requires a negligible amount of power to be operated.

According therefore to the invention there is provided a level indicator of brake fluid for automobile comprising a probe which, on the one hand, plunges in a slightly conductive brake fluid contained in a reservoir electrically connected to the vehicle ground and which, on the other hand, is connected at the free end thereof to a transistor amplifying means energized from the battery of the vehicle and directly driving from its output a warning circuit which produces a warning signal as soon as the brake fluid falls in the reservoir to a predetermined minimum level and uncovers the probe.

The preferred embodiments of the invention will now be described by way of example with reference to the accompanying drawings, in which:

FIG. 1 is a schematic diagram of one embodiment of level indicator according to the invention; and FIG. 2 is a schematic diagram of another embodiment of such a level indicator.

Referring now to FIG. 1, there is disclosed a level indicator consisting of a brake fluid reservoir 10 grounded in T in which plunges a probe or electrode 11. The upper end or free end of the probe 11 is connected through a conductor 12 and a resistor 13 to the base electrode 14 of an input transistor 15. The emitter electrode 16 of the transistor 15 is directly connected through a conductor 17 to the positive terminal +B of the battery of the vehicle. The collector electrode 18 of the transistor 15 is connected through a resistor 19 to the negative terminal —B of the battery, the last-mentioned terminal being connected to the vehicle ground. The collector electrode 18 is also connected through a conductor 22 to the base electrode 20 of an output transistor 21. The emitter electrode 23 of the transistor 21 is directly connected through a conductor 24 to the positive terminal +B, while the collector electrode 25 of the transistor 21 is connected to the negative terminal —B through a line 26 in which is inserted a warning lamp 27.

The operation of the level indicator just described is as follows: when the probe 11 plunges in the brake fluid, the input transistor 15 is rendered conductive by the application of a negative voltage to the base electrode 14 thereof due to the connection through the brake fluid of the probe 11 with the vehicle ground. Then, the potential of the collector electrode 18 of transistor 15 becomes very small due to the high potential drop through the collector resistor 19. Thus, the potential which is applied to the base electrode 20 of the output transistor 21 is also very small, causing the last-mentioned transistor to be disabled. Accordingly, no current can pass through the line 26, and the warning lamp 27 is turned off. As soon as the brake fluid falls in the reservoir 10 to a predetermined minimum level and uncovers the lower end of the probe 11, the input transistor 15 becomes disabled due to the disappearance of the negative voltage which is normally applied to the base electrode 14 thereof. The potential of the collector electrode 18 of the transistor 15 then increases in absolute value and this substantial negative potential is now applied to the base electrode 20 of the transistor 21, rendering the last-mentioned transistor conductive. Accordingly, the line 26 is energized and the warning lamp 27 is turned on, thereby indicating to the user that the brake fluid in the reservoir 10 has fallen to the predetermined minimum level.

The operation just described provides therefore the illumination of the warning lamp for a predetermined minimum level of the brake fluid in the reservoir. However, it might be also useful to do just the reverse and to utilize the extinction of the warning lamp to indicate to the user that the brake fluid in the reservoir has fallen to the predetermined minimum level.

The other embodiment of the invention illustrated in FIG. 2 is directed to such a mode of warning. Referring to this figure, wherein like reference characters refer to like parts shown in FIG. 1, it appears that the input circuit of the input transistor 15 is the same as that represented in FIG. 1 and will not be therefore described. The emitter electrode 16 of the transistor 15 is connected, on the one hand, through a resistor 28 to the positive terminal +B and, on the other hand, through a conductor 29 to the base electrode 20 of the output transistor 21. The collector electrode 18 of the transistor 15 is connected through a conductor 30 to the collector electrode 25 of the transistor 21, the emitter electrode 23 of which is connected through the conductor 24 to the positive terminal +B. The collector electrode 25 of the transistor 21, as in the embodiment shown in FIG. 1, is connected to the negative terminal —B through the line 26 in which is inserted the warning lamp 27.

The operation of the level indicator according to the embodiment shown in FIG. 2 is as follows: when the probe 11 plunges in the brake fluid, the input transistor 15 is still rendered conductive by the application of a negative voltage to the base electrode 14 thereof due to the connection through the brake fluid of the probe 11 with the vehicle ground. The potential of the emitter electrode 16 of the transistor 15 then becomes negative and, since this potential is applied to the base electrode 20 of the output transistor 21, the latter becomes also conductive. Accordingly, the line 26 is energized and the warning lamp 27 is turned on, thereby indicating to the user that the level of the brake fluid in the reservoir 10 is normal. As soon as this level falls to the predetermined minimum level and uncovers the lower end of the probe 11, the input transistor 15 is disabled due to the disappearance of the negative potential which is normally applied to the base electrode 14 thereof. The potential of the emitter electrode 16 of the transistor 15 now becomes positive and the application of this potential to the base electrode 20 of the output transistor 21 disables the last-mentioned transistor. The current flow in the line 26 is interrupted and the warning lamp 27 is turned off, thereby indicating to the user that the brake fluid in the reservoir 10 has fallen to the predetermined minimum level.

In the last mentioned embodiment, apart from the fact that the extinction of the warning lamp indicates a minimum level of brake fluid in the reservoir, this extinction may also mean a failure of the warning lamp or of the transistor amplifying means of the indicator, thereby increasing the reliability of the latter.

Since the level indicator according to the invention makes use of transistors, the amplifying means of the indicator has a very small size, so that it can be easily located in the cap which normally close the brake fluid reservoir.

While two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art. For instance, the transistors utilized in the level indicator may be germanium or silicon transistors, or one of the transistors may be a germanium transistor and the other a silicon transistor. In addition, the number of transistors might be increased or reduced to a single unit, being intended in the last case that the single transistor would provide an amplification sufficient to cause alone the illumination of the warning lamp.

What we claim is:

1. A brake fluid level indicator comprising:
a ground;
a reservoir containing a slightly conductive brake fluid and electrically connected to said ground;
a probe submerged in said brake fluid, said probe and said brake fluid forming a connection to ground;
a battery;
a transistor amplifying means; and
a light bulb;
said transistor amplifying means comprising a first transistor having its base connected through a resistor to one end of said probe, its emitter connected to said battery and its collector connected through a resistor to said ground, and a second transistor having its base connected to said collector of said first transistor, its emitter connected to said battery and its collector through said light bulb to said ground;
said transistor amplifying means responsive to said probe in said reservoir to turn on said light bulb which produces a warning signal as soon as the brake fluid falls in said reservoir to a predetermined minimum level.

2. A brake fluid level indicator comprising:
a ground;
a reservoir containing a slightly conductive brake fluid and electrically connected to said ground;
a probe submerged in said brake fluid, said probe and said brake fluid forming a connection to ground;
a battery;
a transistor amplifying means; and
a light bulb;
said transistor amplifying means comprising a first transistor having its base connected through a resistor to one end of said probe, its emitter connected through a resistor to said battery and its collector connected through said light bulb to said ground, and a second transistor having its base connected to said emitter of said first transistor, its emitter connected to said battery and its collector connected to said collector of said first transistor;
said transistor amplifying means responsive to said probe in said reservoir to turn off said light bulb which produces a warning signal as soon as the brake fluid falls to a predetermined minimum level.

References Cited

UNITED STATES PATENTS

| | | | |
|---|---|---|---|
| 2,828,450 | 3/1958 | Pinckaers | 317—148.5 |
| 3,257,643 | 6/1966 | Jensen. | |
| 3,077,203 | 2/1963 | Wolsh. | |
| 3,181,031 | 4/1965 | Yee. | |
| 3,333,258 | 7/1967 | Walker et al. | |
| 3,334,339 | 8/1967 | McCauley. | |
| 3,335,414 | 8/1967 | Meserow. | |

JOHN W. CALDWELL, Primary Examiner

DANIEL K. MYER, Assistant Examiner

U.S. Cl. X.R.

188—1; 340—59